(12) United States Patent
Griffin

(10) Patent No.: US 6,462,479 B1
(45) Date of Patent: Oct. 8, 2002

(54) VEHICLE HEADLAMP SYSTEM

(76) Inventor: John T. Griffin, 26 Florence Rd., Waltham, MA (US) 02453-1506

( * ) Notice: Subject to any disclaimer, the term of this patent is extended or adjusted under 35 U.S.C. 154(b) by 0 days.

(21) Appl. No.: 09/764,278

(22) Filed: Jan. 19, 2001

(51) Int. Cl.⁷ .................................................. B60Q 1/02
(52) U.S. Cl. ......................... 315/82; 315/83; 307/10.8; 340/471; 362/311
(58) Field of Search .............................. 315/77, 82, 80, 315/83, 78; 307/10.1, 10.8; 362/40, 65, 269, 277, 282, 285, 311, 307; 340/471

(56) References Cited

U.S. PATENT DOCUMENTS

| | | | |
|---|---|---|---|
| 3,723,721 A | | 3/1973 | Weber |
| 3,784,975 A | * | 1/1974 | Ward ............................ 315/83 |
| 3,798,460 A | | 3/1974 | Takeda et al. |
| 4,141,063 A | | 2/1979 | Kumagai et al. |
| 4,282,561 A | | 8/1981 | Yano |
| 4,495,444 A | * | 1/1985 | Thomas ...................... 307/10.8 |
| 4,520,434 A | * | 5/1985 | Birt ............................. 362/309 |
| 5,215,369 A | * | 6/1993 | Carolfi ......................... 362/83 |
| 5,349,267 A | | 9/1994 | Brassier et al. |
| 5,382,877 A | * | 1/1995 | Katsumata et al. ........... 315/82 |
| 5,418,429 A | * | 5/1995 | Laman ......................... 315/82 |
| 5,773,935 A | | 6/1998 | Wagner et al. |
| 6,049,171 A | | 4/2000 | Stam et al. |
| 6,254,259 B1 | * | 7/2001 | Kobayashi .................. 362/465 |
| 6,293,686 B1 | * | 9/2001 | Hayami et al. ............. 362/465 |

* cited by examiner

Primary Examiner—Haissa Philogene
(74) Attorney, Agent, or Firm—Nixon Peabody, LLP

(57) ABSTRACT

The headlamp system provides a reduced amount of illumination adjacent a driver's line of sight while providing a maintained or increased level of illumination from a source that is offset from the driver's line of sight.

12 Claims, 3 Drawing Sheets

VEHICLE HEADLAMP SYSTEM

BACKGROUND OF THE INVENTION

1. Field of the Invention

This invention is related to the field of headlight systems for vehicles. More specifically, this invention is directed to a vehicle headlight system that improves visibility from the vehicle.

2. Description of Related Art

Conventional vehicle headlight systems include a variety of headlights that each provides similar amounts of illumination. When such a vehicle encounters reduced visibility conditions, such as in fog, the driver of a vehicle may only adjust the brightness of the entire headlight system.

Some conventional vehicle headlight systems include "fog lamps" that are positioned generally lower on the vehicle than the corresponding set of headlamps. Presumably, moving the source of illumination to a lower position reduces the amount of glare that a driver experiences when faced with fog or other conditions of reduced visibility. However, all of the conventional vehicle headlight systems place the source of illumination directly in front of the driver.

SUMMARY OF THE INVENTION

The inventor of the present invention discovered that a source of light that is offset from the line of sight of a driver provides increased visibility when compared to a light that is positioned substantially directly along the line of sight of a driver in reduced visibility conditions. The present invention provides a headlamp system for a vehicle where the majority of the illumination power is shifted transversely away from the line of sight of a driver. In accordance with one embodiment of the present invention, a dual headlamp system of a conventional motor vehicle includes the ability to reduce the illumination of a driver side headlamp to reduce the amount of light being reflected back at the driver while maintaining the degree of illumination provided by the passenger side headlamp.

BRIEF DESCRIPTION OF THE DRAWINGS

The exemplary embodiments of this invention will be described in detail, with reference to the following figures, wherein.

DETAILED DESCRIPTION OF THE INVENTION

Figure 1:
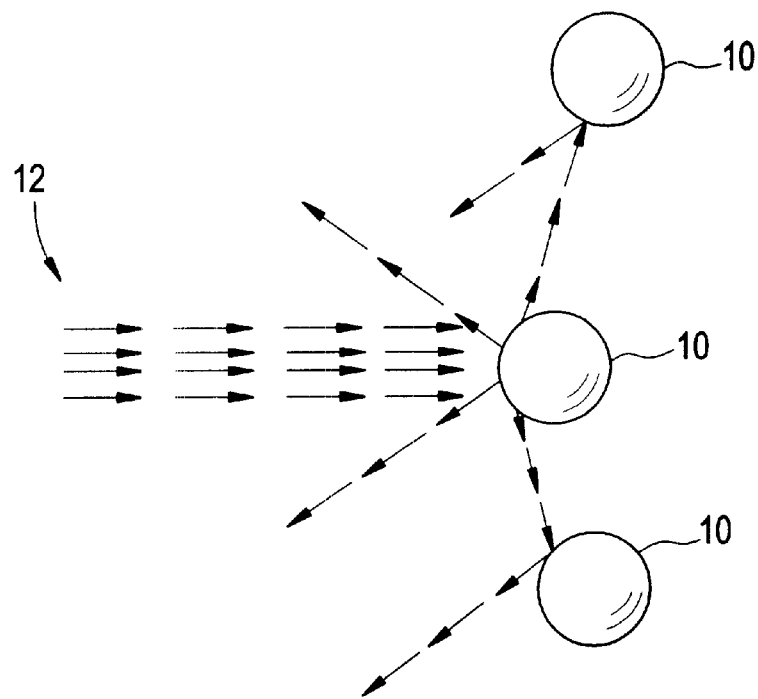
FIG. 1 is a schematic view of light rays being scattered by drops of moisture in an atmosphere.

FIG. 1 shows a schematic diagram of one possible explanation of the reaction of light rays incident upon spheres of water in a moisture-laden atmosphere. The moisture-laden atmosphere includes spheres of water 10 upon which light rays 12 impact. The light rays 12 impact the surface of the water spheres 10 and are generally reflected back in the direction of the source of the light rays 12. The larger the number of water spheres 10 in the atmosphere, the more the light rays 12 are reflected back toward the source of the light.

Figure 2:
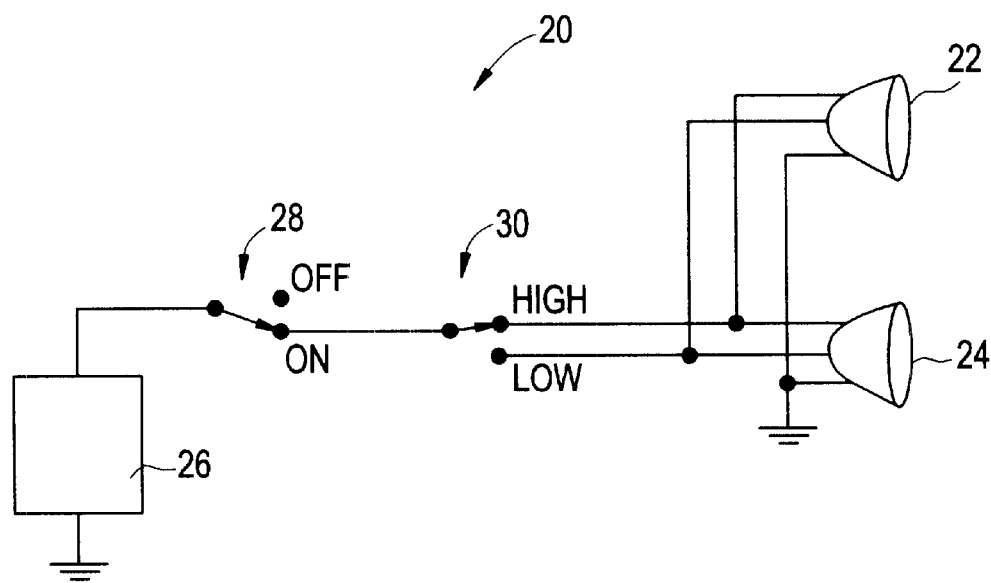
FIG. 2 is a schematic diagram of a simple conventional headlamp system.

FIG. 2 shows a schematic of a conventional headlamp system 20. The headlamp system 20 includes a driver side headlamp 22 and a passenger side headlamp 24. The system 20 also includes a power source such as a battery 26, an on/off switch 28 and a high/low switch 30. The headlamp system 20 is shown in a configuration where the headlamps are in the high beam configuration. Drivers typically use the high beam configuration in areas of reduced visibility to project a large amount of illumination in front of the vehicle. However, in a heavily moisture laden atmosphere, this additional degree of illumination can actually reduce the visibility of the driver because of the lack of penetration of the illumination through the moisture laden atmosphere and the degree that the illumination is reflected back into the driver's line of sight as explained in reference to FIG. 1.

The present invention reduces the degree of illumination that is generally aligned with a driver's line of sight. One embodiment of the present invention provides a lower amount of illumination from the driver side of the vehicle to maintain the visibility of the vehicle to oncoming drivers while still maintaining the amount of illumination from the passenger side headlamp.

Figure 3:
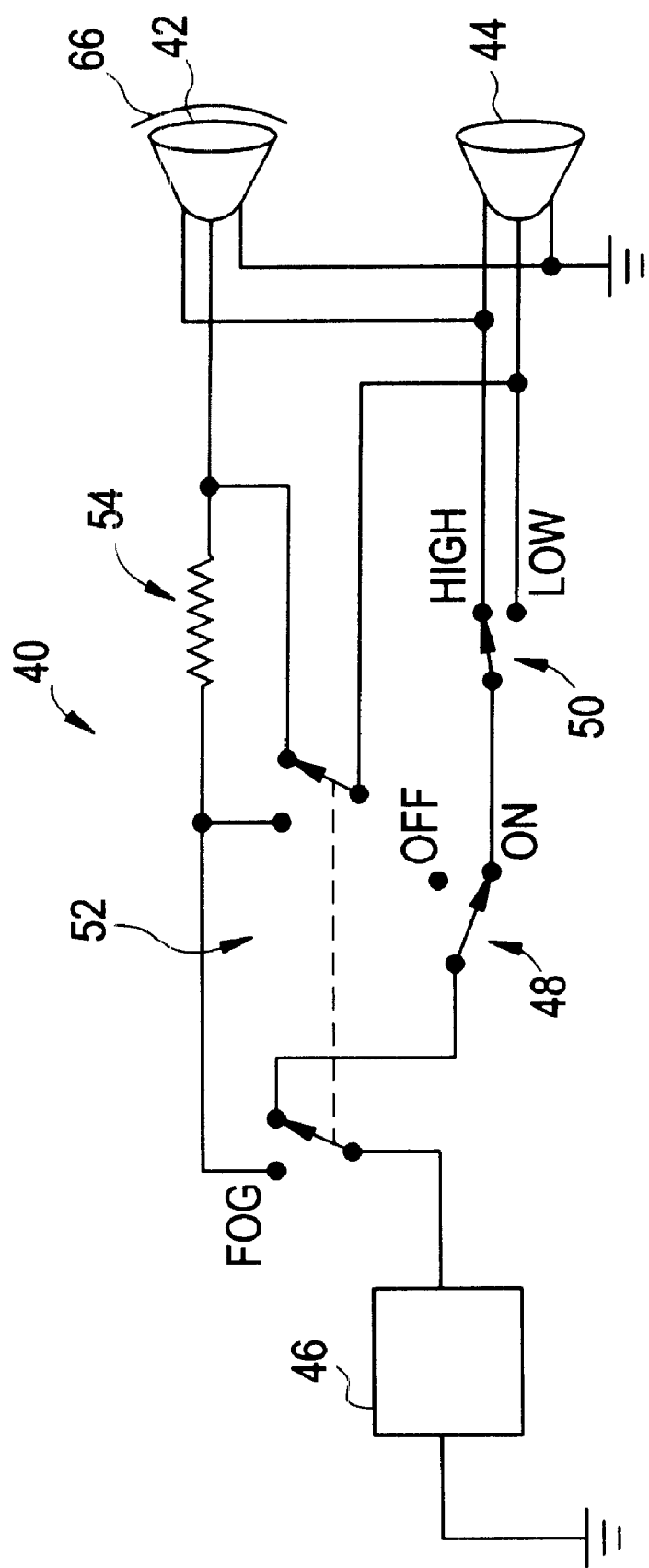
FIG. 3 is a schematic diagram of one embodiment of a headlamp system in accordance with the present invention.

FIG. 3 shows a schematic of a headlamp system 40 in accordance with one embodiment of the present invention. The headlamp system 40 includes a driver side headlamp 42, a passenger side headlamp 44, a power supply or battery 46, an on/off switch 48, and a high/low beam switch 50 similar to the headlamp system 20 of FIG. 2. The headlamp system 40 also includes a double pole/double throw switch 52 and a resistor 54. FIG. 3 shows a configuration of the headlamp system 40 such that the high beams of both headlamps 42 and 44 are illuminated. If a user of the headlamp system 40 switches the switch 52 to the fog position, then power is supplied to the low beam of the driver side headlamp 42 and the low beam of the passenger side headlamp 44. However, because a resistor 54 is in line with the circuit of the low beam system of the driver side headlamp 42 a reduced amount of current is delivered to the driver side headlamp 42. Therefore, the driver side headlamp 42 delivers a reduced amount of illumination in comparison with the passenger side headlamp 44. The switch 52 overrides the high/low switch 50 to provide a difference of illumination in accordance with the present invention.

Figure 4:
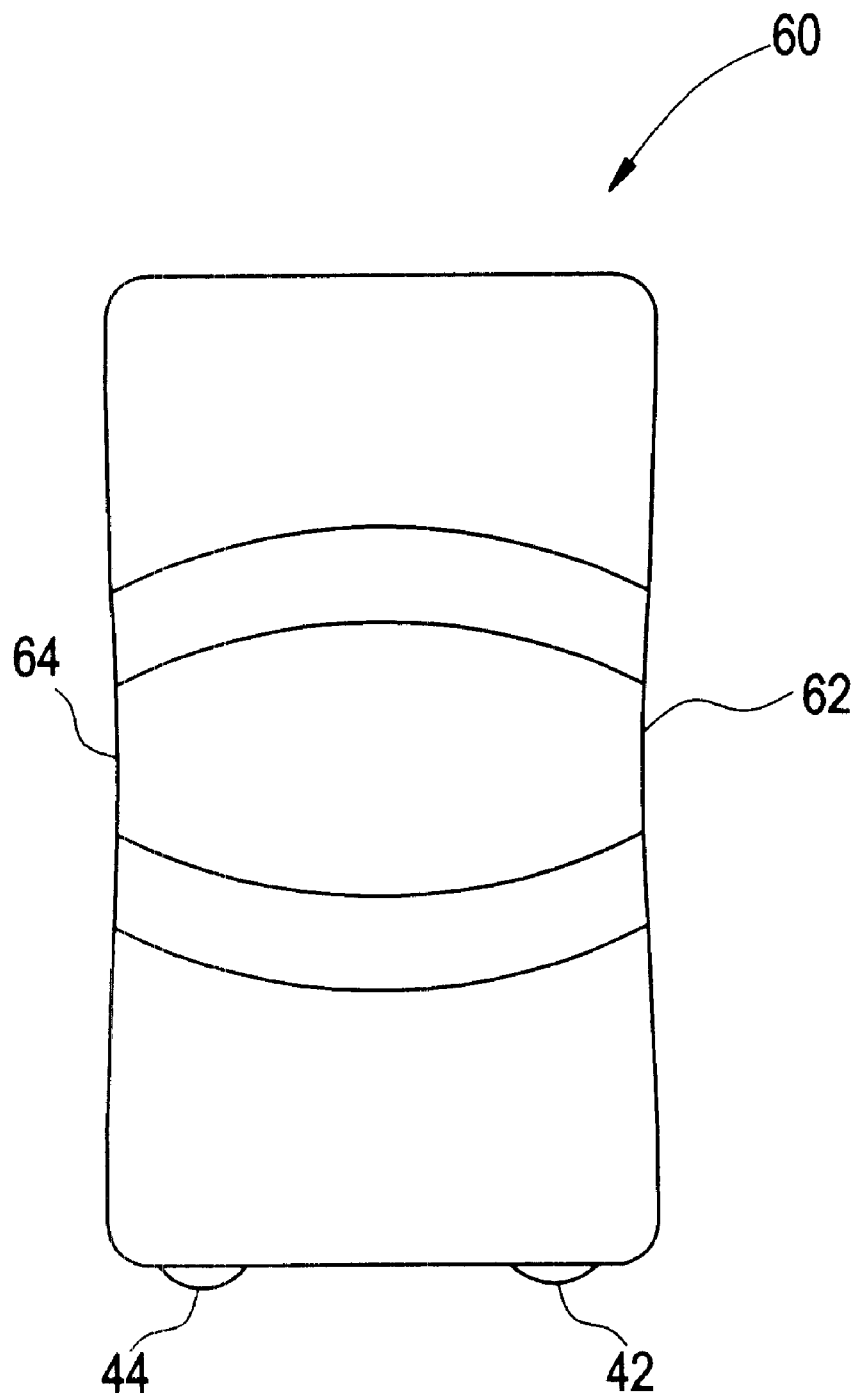
FIG. 4 shows a schematic overhead view of a vehicle incorporating an exemplary embodiment of a headlamp system in accordance with the invention.

FIG. 4 shows an overhead schematic view of a vehicle incorporating an exemplary embodiment of the headlamp system in accordance with the invention. The vehicle 60 includes a drivers side 62 and a passenger side 64. FIG. 4 shows an example of the relative positions of the driver side headlamp 42 and the passenger side headlamp 44. As per convention, a driver (not shown) sits closer to the driver side 62 of the vehicle, thus, the driver sits closer to the driver side headlamp 42 than to the passenger side headlamp 44.

Another embodiment of the invention, not shown, may include a kit that may be retrofitted to an existing vehicle to provide the capability of reducing the illumination of the driver side headlamp 42. For example, as shown in FIG. 3 the headlamp system may incorporate a translucent cover 66 which reduces the illumination from the driver side headlamp 42. A retrofit kit for after-market applications may include a double throw switch as shown in FIG. 3 along with a resistor or other voltage line device that leads to the driver side headlamp. Such a system could easily be retrofitted into an existing headlamp system at a very low cost and would require a minimal amount of time for installation.

Although this invention has been described in conjunction with the specific embodiments outlined above, it is evident that many alternatives, modifications and variations are apparent to those who are skilled in the art. Accordingly, the embodiments of the invention set forth above are intended to be illustrative and not limiting. Various changes may be made without departing from the spirit and scope of the invention.

What is claimed is:

1. A headlamp system for a vehicle for providing increased visibility to a driver of the vehicle when the vehicle is in moisture-laden atmosphere, the system comprising:

a first headlamp that is adapted to provide a first level of illumination; and a second headlamp adapted to simultaneously provide a second level of illumination that is lower than the first level of illumination, wherein the second headlamp is positioned on the vehicle closer to the driver than the first headlamp.

2. The headlamp system of claim 1, wherein the second headlamp comprises a lamp and a translucent cover for reducing the illumination of said lamp.

3. The headlamp system of claim 1, wherein said headlamp system further comprises:

a first switch in communication with said first and second headlamps; and a voltage reducing device in communication with said second headlamp.

4. The headlamp system of claim 3, wherein said first switch is double-pole, double-throw switch.

5. The headlamp system of claim 3, wherein said voltage reducing device comprises a resistor.

6. The headlamp system of claim 3, wherein said headlamp system further comprises a high/low beam switch and wherein said first switch overrides said high/low beam switch.

7. The headlamp system of claim 3, wherein said voltage reducing device comprises a resistor.

8. A system adapted to retrofit a headlamp system on a vehicle having a first headlamp and a second headlamp, wherein said second headlamp is positioned closer to a driver than said first headlamp, said system comprising a first switch adapted to be in communication with said first and second headlamps; and a voltage reducing device adapted to be in communication with said second headlamp, wherein said first switch and said voltage reducing device are adapted to simultaneously reduce the level of illumination of said second headlamp below the level of illumination of said first headlamp when installed in said headlamp system.

9. The system of claim 8, wherein said first switch is a double-pole, double throw switch.

10. The system of claim 8, wherein said voltage reducing device comprises a resistor.

11. The system of claim 8, wherein said headlamp system includes a high/low beam switch and wherein said first switch overrides said high/low beam switch.

12. A system adapted to retrofit a headlamp system on a vehicle having a first headlamp and a second headlamp, wherein said second headlamp is positioned closer to a driver than said first headlamp, said system comprising a translucent cover adapted to be removably positioned to reduce the level of illumination of said second headlamp below the level of illumination of said first headlamp.

\* \* \* \* \*